United States Patent [19]

Ashforth

[11] 4,155,256
[45] May 22, 1979

[54] INDICATING INSTRUMENTS

[75] Inventor: Rodney H. Ashforth, Cheltenham, England

[73] Assignee: Smiths Industries Limited, London, England

[21] Appl. No.: 854,164

[22] Filed: Nov. 23, 1977

[30] Foreign Application Priority Data

Nov. 24, 1976 [GB] United Kingdom ............... 49078/76

[51] Int. Cl.² .............................................. G01P 1/08
[52] U.S. Cl. ......................................... 73/489; 73/490
[58] Field of Search ......................... 73/490, 489, 114; 116/129 S, 129 T, 114 A, 129 E, DIG. 14, 114 W, 129 F, 57, 114 R; 364/426, 428

[56] References Cited

U.S. PATENT DOCUMENTS

| | | | |
|---|---|---|---|
| 1,401,315 | 12/1921 | Clark | 73/114 |
| 1,629,680 | 5/1927 | Cooke | 116/114 R |
| 2,961,230 | 11/1960 | Moro | 116/57 |
| 3,034,096 | 5/1962 | Craddock | 73/489 |
| 3,502,049 | 3/1970 | Samet | 116/135 |

FOREIGN PATENT DOCUMENTS 2241427 3/1974 Fed. Rep. of Germany.

Primary Examiner—S. Clement Swisher
Assistant Examiner—Denis E. Corr
Attorney, Agent, or Firm—Pollock, Vande Sande & Priddy

[57] ABSTRACT

An indicating instrument particularly for use in a vehicle comprises a first element which is moved behind a window of the instrument such that the amount of the first element visible in the window is indicative of the distance travelled by the vehicle, and a second element that is moved in dependence upon the speed of the vehicle and such that the second element is obscured from view in the window by the first element while a predetermined relationship exists between the speed and distance.

12 Claims, 4 Drawing Figures

INDICATING INSTRUMENTS

BACKGROUND OF THE INVENTION

This invention relates to indicating instruments.

The invention is especially concerned with indicating instruments for use in assisting the pilot of an aircraft during the 'ground-roll' phase of landing, that is, during the phase immediately after touchdown as the aircraft rolls along the runway.

It is desirable, especially during poor visibility conditions to provide the pilot of an aircraft with information concerning the speed of the aircraft along the runway, and also the length of runway remaining available for bringing the aircraft to a halt. From this information, the pilot can determine both his position along the runway, and whether or not he needs to increase the aircraft's rate of deceleration in order to stop within the available length of runway. With a known form of indicator used for displaying such information, the ground speed and remaining runway length is presented to the pilot in the form of analogue and digital displays respectively. Such an indicator suffers from the disadvantage that the pilot is required to carry out mental calculations from the information displayed on the distinct analogue and digital displays to determine whether his aircraft is going to stop in the available distance and to do so during an especially busy and dangerous period of the landing operation.

SUMMARY OF THE INVENTION

It is an object of the present invention to provide an indicating instrument which is suitable for use in an aircraft to display ground-roll information, and which can be used to overcome the above disadvantage to a substantial extent.

According to one aspect of the present invention there is provided an indicating instrument for providing an indication in accordance with the magnitude of a first variable and dependent upon the existence of a predetermined relationship between said first variable and a second variable, comprising a first element, means for moving said first element in accordance with the magnitude of said first variable, a second element, and means for moving said second element relative to said first element in accordance with the magnitude of said second variable and such that said second element is obscured from view by said first element in dependence upon whether said relationship exists.

The indicating instrument may include a window through which the two elements may be viewed, and it may be arranged that the amount of said first element visible through said window is indicative of the magnitude of said first variable.

The said first and second elements may be portions of individual tapes or other members, and may be of distinctive colours; the second-element portion may however be transparent or provided by an aperture in a member that overlies a coloured background to achieve essentially the same effect.

A third element may be connected to said second element for movement therewith, and may extend transversely of said first element so as to be visible through a window of the instrument. The amount of said third element visible through the window may be indicative of the magnitude of said second variable.

According to another aspect of the present invention there is provided an indicating instrument for use in a vehicle, comprising a first element, means for moving said first element such that the amount of said first element visible in a window of the instrument is indicative of the distance travelled by said vehicle, a second element, and means for moving said second element in dependence upon the speed of by the vehicle and such that said second element is obscured from view in said window by said first element while a predetermined relationship exists between said speed and distance.

BRIEF DESCRIPTION OF THE DRAWINGS

An indicating instrument in accordance with the present invention and for use as an aircraft ground-roll indicator, will now be described, by way of example, with reference to the accompanying drawings in which.

DETAILED DESCRIPTION OF THE PREFERRED EMBODIMENTS

Figure 4:
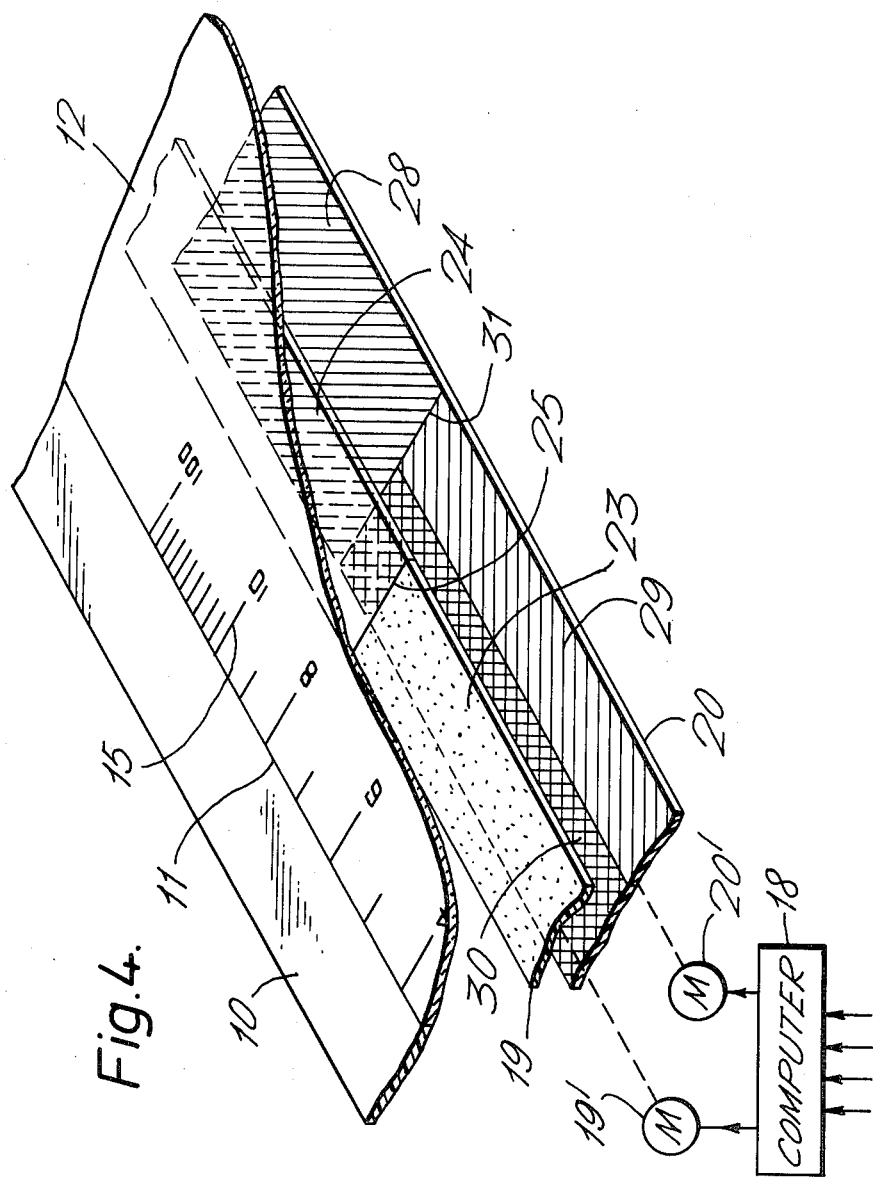
FIG. 4 is a part-sectional and part-schematic representation of the ground-roll indicator.

Referring to the drawings and in particular to FIG. 4, the indicator includes a front plate 10 having a generally rectangular window 11 therein which is covered by a sheet 12 of transparent plastic material (for example, material as sold under the Registered Trade Mark 'Perspex'). The sheet 12 has two scales 15 and 16 (See FIG. 1) marked on its surface that extend along the upper and lower edges respectively of the window 11 to overlie two movable tapes 19 and 20 that are visible through the window.

The tape 19 is moved from right to left (in the drawings) in accordance with the distance travelled by the aircraft along the runway after touchdown. The distance is calculated by a computer 18 which is fed with information from a wheel-speed sensor mounted on a wheel of the aircraft, and which energises an electric motor 19' (FIG. 4) to drive the tape 19 in accordance with progress of the aircraft down the runway. The tape 19 includes an opaque portion 23 of readily distinguishable colour (for example, white), and a transparent portion 24 so that, as the tape is driven from right to left the decreasing amount of the coloured portion 23 of the tape 19 visible to the pilot through the window 11 is indicative of the decreasing amount of runway remaining. The length of runway remaining in terms of meters, is indicated against the non-linear scale 15 by the interface 25 of the portions 23 and 24 of the tape 19.

The runway distance available for a particular airfield is determined from the total runway length and the touchdown point on the runway. This value is set into the computer before landing, and, upon touchdown, the computer energises the motor 19' to drive the tape 19 to the appropriate position along the scale 15 to indicate the amount of available runway. The moment of touchdown is signalled to the computer 18, so as to initiate movement of the tape 19, from a sensor responsive to compression of the undercarriage-suspension system of the aircraft.

The tape 20 which includes three distinct opaque portions 28, 29 and 30 coloured black, yellow and red respectively, is disposed behind the window 11 and is partially overlapped across its width by the tape 19 such that the tape 19 lies directly in front of the red portion 30 and a part of the black portion 28. The tape 20 is moved in the same sense as the tape 19 (that is, from right to left in the drawings), but in accordance with the decreasing speed of the aircraft. In this respect the tape 20 is driven by an electric motor 20' such that the amount of the yellow portion 29 visible to the pilot through the window 11 is indicative of the decreasing ground speed of the aircraft. The interface 31 of the portions 28 and 29 of the tape 20 indicates the ground speed of the aircraft, in terms of knots, against the linear scale 16.

The ground speed of the aircraft is determined by the computer 18 in accordance with data derived from the inertial-navigation system of the aircraft, or alternatively, from the aforementioned wheel-speed sensor.

Figure 1:
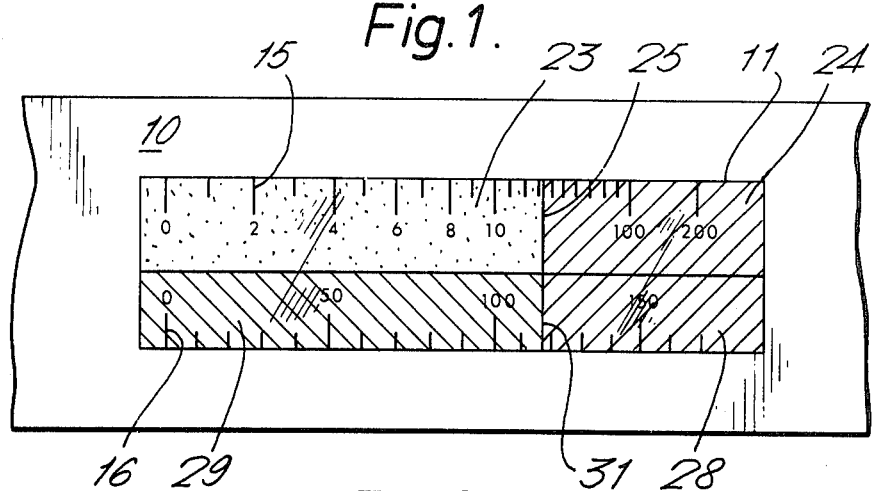
FIGS. 1 to 3 illustrate displays provided by the instrument in differing circumstances of ground-roll of the aircraft.

FIG. 1 illustrates the display provided by the indicator in an ideal ground-roll situation in which the interfaces 25 and 31 on the tapes 19 and 20 respectively are aligned with one another such that the red portion 30 of the tape 20 is completely hidden from the pilot's view with just the black portion 28 visible through the transparent portion 24 of the tape 19. This, so long as the interfaces 25 and 31 continue to remain aligned, as they are driven to the left, conveys to the pilot that the speed of the aircraft and the runway distance available will reach zero together; the situation is therefore safe.

The linear scale 16 and the non-linear scale 15 are calibrated such that the two interfaces 25 and 31 are aligned and move together towards their respective zeros, when the aircraft decelerates at a steady rate, of, for example, approximately 0.15 g, compatible with passenger comfort. If, for example, the aircraft is one which necessarily lands at high speeds, and therefore needs to decelerate faster, the scale 15 can be calibrated such that the interfaces 25 and 31 move together when a deceleration of, for example 0.2 g, is achieved.

Figure 2:
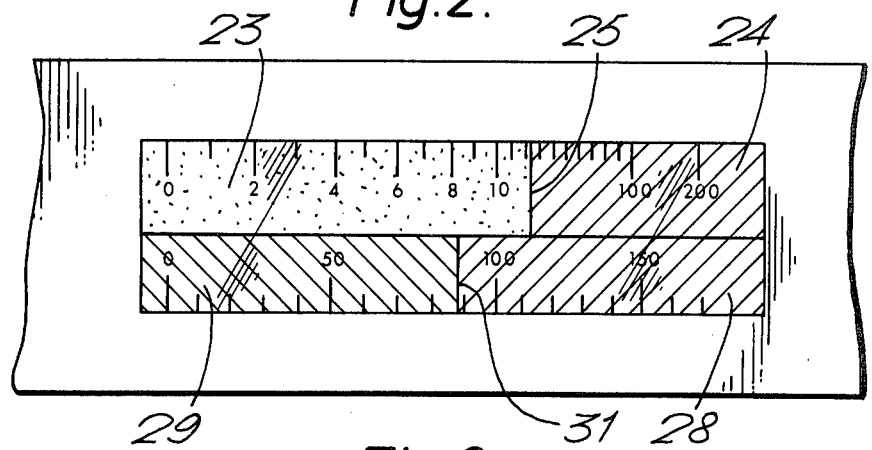

FIG. 2 illustrates circumstances in which the interface 31 on the tape 20 is ahead of the interface 25 on the distance tape 19. This indicates to the pilot that if the same rate of deceleration is maintained, the speed of the aircraft will reach zero before the end of the runway. This is a safe situation in which the rate of deceleration could be eased to reduce any passenger discomfort. In this respect the brakes might be released in order to "allow" tape 19 to catch up, and then run together with tape 20 so as to maintain the condition applicable to the display of FIG. 1.

Because the portion 23 of the distance tape 19 lies in front of the tape 20, available distance can be readily read from the scale 15. With the black portion 28 of the tape 20 ahead of the interface 25 of the tape 19 the red portion 30 is entirely obscured.

Figure 3:
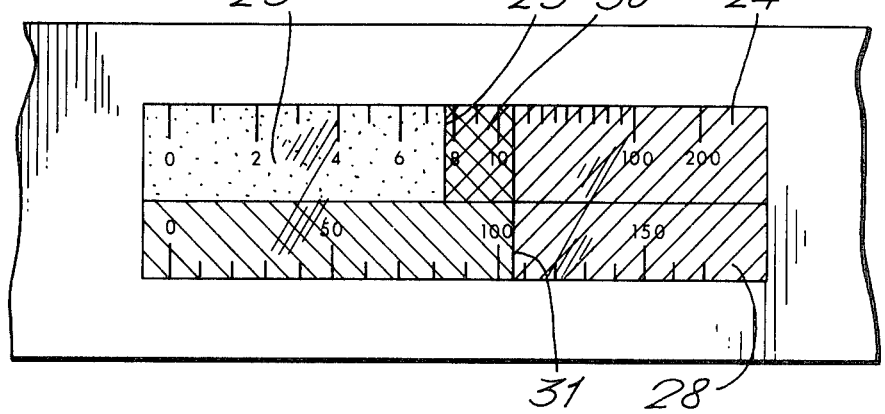

FIG. 3 illustrates circumstances in which the interface 25 in the distance tape 19 is ahead of the interface 31 on the ground speed tape 20, thereby indicating that the aircraft will still have a finite speed when the end of the runway is reached. This is a potentially dangerous situation, and the pilot must act to increase the rate of deceleration until the interfaces 25 and 31 are at least as shown in FIG. 1, so as to ensure that the aircraft will stop in the available distance. The existence of this potentially dangerous situation is signalled to the pilot by the appearance of the red portion 30 of the tape 20 in these circumstances.

The red portion 30 of the tape 20 becomes visible through the transparent portion of the tape 19 only when the interface 25 is ahead of the interface 31. The red colouring signifies danger, and the amount of red visible is dependent on the degree of danger. For example, if the runway distance available is decreasing faster than the ground speed, the amount of red increases, indicating a worsening situation. Conversely, if the pilot applies more braking force to the aircraft, the amount of red will decrease as the speed tape 20 catches up with the ground tape 19, until the portion 30 is completely obscured by the portion 23 of the tape 19 (as with the displays of FIGS. 1 and 2).

The indicator shown in FIGS. 1 to 4 may be used during taxying to provide an indication of the distance travelled by the aircraft. Such indication is particularly helpful in conditions of poor visibility when the pilot could not otherwise be able to determine his position on the runway.

The indicator may be used with advantage where runway-occupancy time is to be reduced. In this connection the aircraft may be quickly decelerated on landing to some relatively high taxying speed (for example, 50 knots); this will result in the interface 31 on the speed tape 20 moving ahead of the interface 25 on the distance tape 19. The high-taxying speed is then maintained until the interface 25 catches up with the interface 31, after which the aircraft is decelerated, again keeping the interfaces 25 and 31 together to attain a lower taxying speed, prior to turning off the runway.

A light may be disposed behind the red portion 30 of the tape 20 to illuminate that portion and thereby more readily attract the pilot's attention.

The portion 30 of the tape 20 may be transparent rather than red, and in these circumstances a red-coloured plate may be disposed behind the portion 30 to provide the appropriate warning when the portion 30 is revealed in the window 11. Furthermore, the tapes 19 and 20 may be replaced by slidable plates, or by rotatably-mounted discs which are displacable relative to another about a common axis within an arcuate window; the transparent portions in these circumstances may be provided by apertures in the plates or discs.

I claim:

1. An indicating instrument for providing an indication in accordance with the magnitude of a first variable and dependent upon the existence of a predetermined relationship between said first variable and a second variable comprising, a first element, a window, means for moving said first element such that the proportion of said first element visible in said window is indicative of the magnitude of said first variable, a second element, and means for moving said second element relative to said first element in accordance with the magnitude of said second variable and such that said second element is obscured from view in said window by said first element in dependence upon whether said relationship exists.

2. An indicating instrument according to claim 1, wherein the said first and second elements are portions of individual members.

3. An indicating instrument according to claim 2, wherein said individual members are tapes.

4. An indicating instrument according to claim 3, wherein a third element is connected to said second element for movement therewith.

5. An indicating instrument according to claim 4, wherein said third element extends transversely of said first element so as to be visible through said window.

6. An indicating instrument according to claim 5, wherein the amount of said third element visible through the window is indicative of the magnitude of said second variable.

7. An indicating instrument according to claim 6, wherein said first and second elements are of distinctive colours.

8. An indicating instrument according to claim 6, wherein said a portion of the first-element member is transparent and overlies a coloured background.

9. An indicating instrument according to claim 6, wherein a portion of the first-element member includes an aperture and overlies a coloured background.

10. An indicating instrument for use in a vehicle comprising, a first element, a window, means for moving said first element such that the proportion of said first element visible in said window of the instrument is indicative of the distance travelled by said vehicle, a second element, and means for moving said second element in dependence upon the speed of said vehicle and such that said second element is obscured from view in said window by said first element while a predetermined relationship exists between said speed and distance.

11. An aircraft indicating instrument for providing to the pilot an indication of whether the aircraft at the time of roll-out along the runway will, for a given deceleration, be able to stop within a predetermined runway length, said apparatus comprising:

first and second elements each independently movable relative to a window defined in the instrument, said first element including a distinctive first portion and a transparent second portion, means for moving said first element relative to said window in accordance with the distance moved by said aircraft along the runway after touchdown and in a direction causing increasingly less of said first portion to be visible in said window as the aircraft rolls along the runway, said second element including at least first and second distinctive portions separated by an interface and underlying said first element in such a manner that varying parts of said first and second distinctive portions are visible through said transparent second portion of said first element, and means for moving said second element in the same direction as said first element in accordance with the velocity of the aircraft.

12. The instrument of claim 11 in which each said element comprises a tape which is moved longitudinally.

* * * * *